United States Patent
Simwonis et al.

(10) Patent No.: US 7,186,368 B2
(45) Date of Patent: Mar. 6, 2007

(54) METHOD FOR PRODUCING AN ELECTRODE THAT HAS A TEMPERATURE-STABILIZED CONDUCTIVITY

(75) Inventors: Dimitrios Simwonis, Melissia (GR); Frank Tietz, Jülich (DE); Hans-Peter Buchkremer, Heinsberg (DE)

(73) Assignee: Forschungszentrum Jülich GmbH (DE)

( * ) Notice: Subject to any disclaimer, the term of this patent is extended or adjusted under 35 U.S.C. 154(b) by 562 days.

(21) Appl. No.: 10/312,794

(22) PCT Filed: Jun. 29, 2001

(86) PCT No.: PCT/EP01/07475

§ 371 (c)(1),
(2), (4) Date: Aug. 8, 2003

(87) PCT Pub. No.: WO02/03491

PCT Pub. Date: Jan. 10, 2002

(65) Prior Publication Data

US 2004/0033886 A1    Feb. 19, 2004

(30) Foreign Application Priority Data

Jun. 30, 2000    (DE) ................. 100 31 102

(51) Int. Cl.
  *B28B 1/00*        (2006.01)
  *H01M 4/88*        (2006.01)
(52) U.S. Cl. ................... 264/618; 264/651
(58) Field of Classification Search ............... 264/618, 264/603, 651; 429/33, 29, 44, 46

See application file for complete search history.

(56) References Cited

U.S. PATENT DOCUMENTS

| | | | |
|---|---|---|---|
| 3,300,344 A   | 1/1967 | Bray et al. | |
| 4,463,068 A * | 7/1984 | Cohn et al. | 429/34 |
| 5,261,944 A * | 11/1993 | Lockhart et al. | 75/628 |
| 6,048,636 A * | 4/2000 | Naoumidis et al. | 429/44 |
| 6,228,521 B1 * | 5/2001 | Kim et al. | 429/33 |

(Continued)

FOREIGN PATENT DOCUMENTS

DE    196 37 261 A1    4/1998

(Continued)

OTHER PUBLICATIONS

Matsushima et al. "Change of physical properties of Ni/YSZ cements by the continuous reduction solid oxide fuel cell anodes", INSPEC/IEE Abstract, Nov. 1997.

*Primary Examiner*—Steven P. Griffin
*Assistant Examiner*—Carlos Lopez
(74) *Attorney, Agent, or Firm*—The Webb Law Firm

(57) ABSTRACT

The invention relates to a method for the production of an electrode for use at high temperatures, in which an electrode green compact is formed from a ceramic slip. The slip is formed from at least one solid electrolyte material as well as a metal oxide powder. The green compact is dried and sintered.

A porous hard granular material of solid electrolyte material is used in the slip, the mean diameter of the metal oxide powder grains not exceeding or not substantially exceeding the mean diameter of the pores of the hard granular material.

An electrode having a temperature-stable conductivity is obtained according to the invention. The area of use of the electrode is typically in high-temperature fuel cells.

20 Claims, 2 Drawing Sheets

U.S. PATENT DOCUMENTS

| | | | |
|---|---|---|---|
| 6,287,716 B1 * | 9/2001 | Hashimoto et al. | 429/33 |
| 6,410,160 B1 * | 6/2002 | Landin et al. | 428/613 |
| 6,420,064 B1 * | 7/2002 | Ghosh et al. | 429/40 |
| 6,844,099 B1 * | 1/2005 | Gorte et al. | 429/33 |
| 2001/0008094 A1 * | 7/2001 | Piro et al. | 75/230 |
| 2002/0098406 A1 * | 7/2002 | Huang et al. | 429/44 |
| 2003/0035989 A1 * | 2/2003 | Gorte et al. | 429/30 |
| 2003/0211381 A1 * | 11/2003 | Gorte et al. | 429/44 |
| 2004/0265483 A1 * | 12/2004 | Meyer et al. | 427/115 |

FOREIGN PATENT DOCUMENTS

DE    10031123 A1 *    4/2002

* cited by examiner enlarged section on a scale of 10 μm

——— YSZ coarse grain at 1000°C, precalcined for 1 hour
------- YSZ coarse grain at 1200°C, precalcined for 1 hour

METHOD FOR PRODUCING AN ELECTRODE THAT HAS A TEMPERATURE-STABILIZED CONDUCTIVITY

BACKGROUND OF THE INVENTION

The present invention relates to a method for producing an electrode for use at high temperatures. A ceramic slip is prepared that contains a metal oxide powder as well as a solid electrolyte powder. An electrode green compact is formed from the slip. The green compact is dried and sintered. The metal oxide is then reduced to metal, in which connection the reduction may also take place during use in, for example, a high temperature fuel cell. Stabilised zirconium dioxide for example is provided as solid electrolyte, and nickel oxide for example is provided as metal oxide.

The core component of a high temperature fuel cell (HTFC), which is characterised by the direct conversion of chemical energy (in the form of combustible gases) into electrical energy, consists of a solid electrolyte on which are mounted an anode and a cathode. The operating temperature is between 750° and 1000° C. Combustion of a combustible gas takes place at the anode side, with consumption of oxygen. The anode consists for example of a mixture of nickel and $Y_2O_3$-stabilised zirconium dioxide (YSZ) in order to ensure the necessary electrical and ionic conductivity. The structure of such anodes must be gas-permeable, but on the other hand must ensure the high electrical conductivity. To this end, despite the high porosity the Ni phase and the YSZ phase must have contact with one another. This structure should not age in operation at temperatures of 750° to 1000° C., i.e. its properties should as far as possible not change, in order to obtain an optimal energy yield.

In high temperature fuel cells Ni/YSZ cermets, which were described for the first time by the Westinghouse Company in the 1960s, are often used as anode materials. A typical mixture contains 30 vol. % of Ni referred to the total solids volume. Below this Ni content the conductivity falls by roughly four orders of magnitude [see publication: Ivers Tiffée E., Wersing W., Schießl M., Ber. Bunsenges. Phys. Chem., 94 (1990), p. 978]. Beyond this limit no significant rise in electrical conductivity above 3500 S·cm has been found in cermets [see publication: Dees D. W., Claar T. D., Hasler T. E., Fee D. C., Mrazek F. C., Journal of Electrochem. Soc., 34 (1987), p. 1241]. Completely porous and conducting anode cermets and anode function layers, which essentially contain about 30 vol. % of Ni in addition to a solid electrolyte such as for example YSZ (8–11 mole % of stabilised zirconium dioxide) are thus known in the prior art. An electronic (Ni) conductivity and an ionic conductivity (stabilised zirconium dioxide) are thereby ensured. With this mixture the coefficient of expansion of the anode is furthermore matched to that of the electrolyte. In this connection a so-called anode function layer acts as transition zone between the actual anode and the gas-tight, oxygen ion-conducting electrolyte in the high temperature fuel cell. In particular the proportion of the three-phase boundaries of electrically conducting nickel, pore space filled with fuel gas, and oxygen ion-conducting YSZ determines the efficiency of an anode. The main task of an anode is to accept the electrons that the oxygen ions release into the gaseous phase when they leave the solid electrolyte.

In recent years numerous tests have been carried out on the ageing resistance (stability) of anode structures. It was found that, with prolonged use of the anodes at the operating temperature (750°–950° C.) the conductivity of the anodes drops sharply. After ageing of the anodes in the combustion gas mixture (Ar 4% $H_2$:4% $H_2O$) for 2000 hours, a drop in the effective electrical conductivity of 20–40% of the initial conductivity at room temperature was measured. This could be explained by the tendency of nickel to minimise the surface energy [see publication: Tsoga A., Naoumidis A., Nikolopoulos P., "Wettability under non reactive and reactive conditions in the system Ni/YSZ and Ni/Ti—$TiO_2$/YSZ" NATO ASI Ser., Ser. 3 1998, 58, pp. 79–86]. When thermally activated the Ni phase has a tendency to form agglomerates in the anode. Accordingly, the initially finely divided Ni channels crack, particularly in the region of large pores. For this reason the Ni network is no longer so finely divided, some current pathways become interrupted, and there is a drop in conductivity. In addition the number of three-phase points in the anode function layer also decreases, and the efficiency of the whole high temperature fuel cell is considerably reduced.

The aforedescribed phenomenon of the drop in electrical conductivity has hitherto been observed to a greater or lesser extent, irrespective of the method used to produce the anode and/or anode function layer (calendering, coat-mix method with thermocompression, film casting and silk-screen printing as well as vacuum slip cast layers or plasma spraying layers), but in any case is regarded as economically disadvantageous.

SUMMARY OF THE INVENTION

The object of the present invention is to provide a method for producing an electrode having a reduced, thermally-induced loss of electrical conductivity.

According to the invention the slip mentioned in the introduction comprises porous, preferably hard granules of solid electrolyte material. The mean diameter of the powder grains of the metal oxide does not significantly exceed the mean diameter of the pores of the granules. The reason for this is to ensure that powder grains of the metal oxide can as a rule penetrate the pores of the granules without any problem.

The porous hard granules are understood to be a porous hard agglomerate with bridges of solid material. The strength of the porous hard granules should be such that they can withstand substantially undamaged the preparation of the film casting slip.

It has been found that the conductivity of an electrode is then significantly more stable over a long period at high operating temperatures if powder grains of the metal oxide have penetrated into the pores of the hard granules before the sintering, for example as a result of a mixing process.

The required proportion of metal oxide powder in the slip depends on the desired properties of the electrode. It may be left to the person skilled in the art to determine in each case the respective optimal proportion. The lower limit should be selected so that the desired electrical conductivity is obtained. In order to achieve this target, the proportion of metal oxide does not as a rule fall below 20 vol. %, preferably 30 vol. %, referred to the total solids volume of the slip.

A person skilled in the art can also easily determine by means of a few tests what the proportion of porous, preferably hard granules in the slip should advantageously be in order to obtain an electrode that is stable over prolonged use.

The proportion of porous granules is as a rule 5 vol. % to at most 40 vol. % of the total powder fraction, typically 5 to 50 vol. % (the reason is that, below 5 vol. % the stabilising effect of the Ni phase is not significant—above 40 vol. % an unsatisfactory sintering is to be expected, i.e. lower strength).

The anode substrate and/or the anode function layer exhibit a high stability to a thermal ageing of the electrical conductivity of the components due to the operating temperature of the high temperature fuel cell. According to the invention an anode cermet can be produced that exhibits an improvement in ageing resistance of more than 6% after an ageing of 2000 hours, compared to anode substrates of the prior art.

As a rule the slip comprises conventional solid electrolyte powder as in the prior art, in order to improve the sintering properties.

An anode for a high temperature fuel cell is according to the invention preferably produced from a mixture of NiO powder and YSZ powder, and porous hard YSZ granules, since these are proven materials for the intended use. The mean grain sizes of the two aforementioned powders are typically below 1 μm. The invention is characterised by the introduction of the correspondingly coarser, sufficiently strong YSZ powder granules with an intrinsic porosity of these granules. During the preparation of the ceramic composition the NiO powder can be partially ground into this continuously porous structure of the granules. The NiO powder remains anchored there up to the final reduction of the NiO/YSZ substrate to form the Ni/YSZ cermet. A channel system of conducting elementary nickel is formed in the hard YSZ granules homogeneously distributed in the anode. These Ni structures in the internal capillaries of the YSZ granules have surfaces and contact conditions that are altered in such a way with respect to Ni fractions that are outside this structure, that no agglomeration or only a slight agglomeration of the nickel occurs over time. These microregions support a stable nickel network that remains finely divided over anode operating times of more than 2000 hours, exhibits only slight agglomeration, and significantly reduces the electrical conductivity ageing.

DETAILED DESCRIPTION OF THE DRAWINGS

FIG. 1 (inset) is an enlarged section;

DETAILED DESCRIPTION OF THE PREFERRED EMBODIMENTS

The following more detailed description of the procedure will help to explain the relationships: the ceramic mixture for the anode cermet is produced from various powders and/or powder mixtures of which the moulded article is to consist. By way of example, a powder mixture is employed here consisting of a zirconium dioxide powder (YSZ) stabilised with at least 8 mole % of yttrium, and an NiO powder. However, other raw materials may obviously also be used as solid body electrolyte or metal oxide in the anode of the high temperature fuel cell. In addition commercially available polymeric dispersants and binder systems, such as are used in film casting, are advantageously employed in agreement with the prior art. The proportion of YSZ is now subdivided, corresponding to the invention, in particular into a coarse grain fraction and a fine grain fraction. The coarse fraction preferably has a mean grain size of ca. 10 μm to 100 μm and has a special porous structure. The fine fraction, which is <1 μm, serves for sintering.

Figure 1:
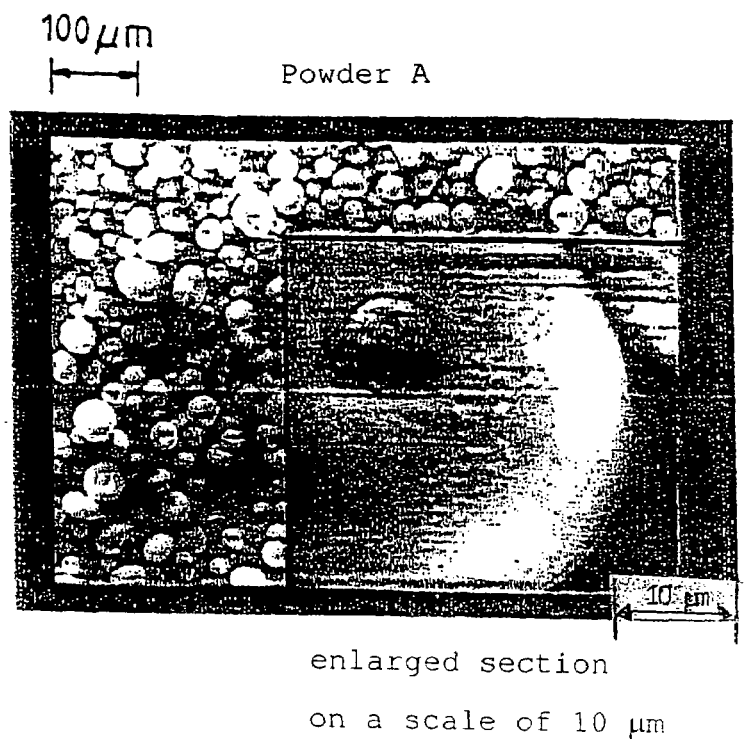
FIG. 1 is a graphic illustration of a micrograph of granules formed by spray drying and prior to calcination.

The coarse fraction has a continuous intrinsic porosity. These coarse fractions may be granule grains that are produced from fine powders via a spray drying as illustrated in FIG. 1 or by build-up granulation, or that are produced via a coprecipitation process followed by spraying of the powder suspension in a spraying tower.

Figure 2:
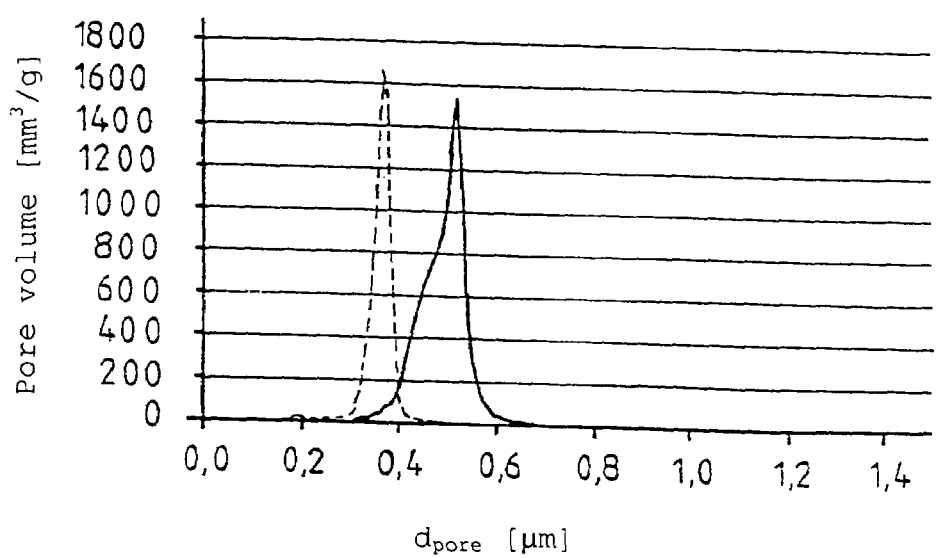
FIG. 2 is a graph showing characteristic porosity values calcined at different temperatures.

Hard agglomerates are now produced by calcination from such so-called soft agglomerates, which latter decompose again under the addition of solvents. This temperature treatment takes place at temperatures in the range from 700° to 1200° C. The agglomerates that are thereby formed are so hard that they are not completely destroyed during the subsequent processing. A partial destruction may be advantageous since a finer state of division is thereby produced. In the calcination agglomerates with an interconnecting intrinsic porosity are thus formed by sintering, whose degree of porosity and mean pore diameter can be adjusted by the choice of the starting agglomerate and specific choice of the calcination parameters (duration and maximum temperature). The pore diameters have mean values between 0.1 and 2.0 μm. FIG. 2 shows the porosity characteristic values, determined by means of mercury pressure porosimetry, of two grains for spraying calcined grains at different temperatures, which were produced by spray drying of a YSZ powder having a mean grain size of 0.2 μm followed by calcination. The calcined grains obtained in this way have mean diameters of 10 to 500 μm, typically of 10 to 50 μm.

Figure 3:
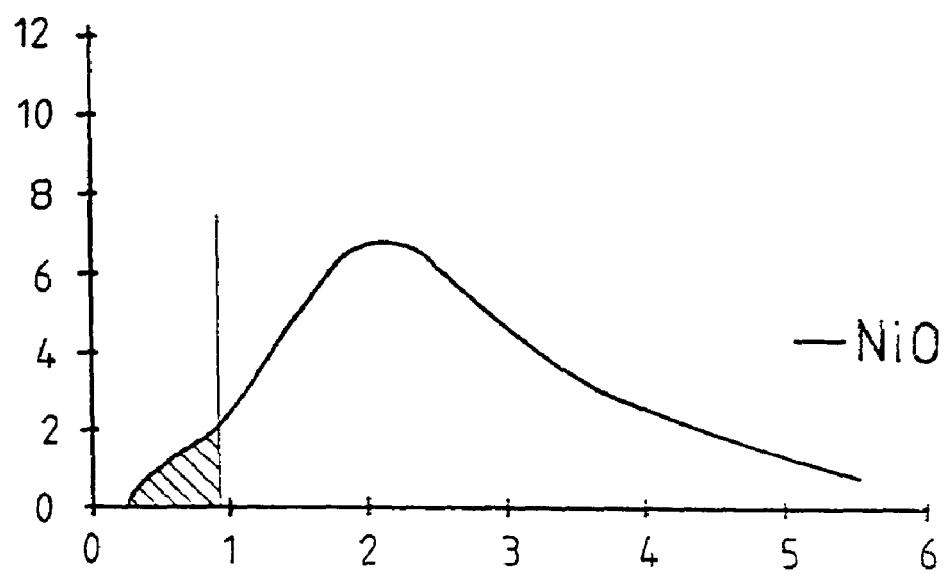
FIG. 3 is a graph illustrating grain size distribution of a NiO powder.
Figure 4:
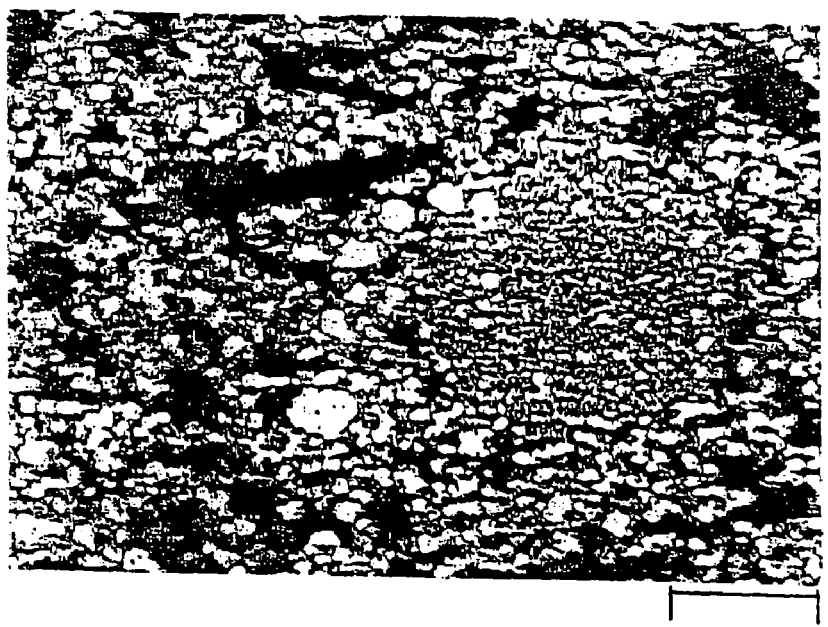
FIG. 4 is a graphic illustration of a micrograph showing finely divided nickel interspersed in a hard YSZ granular material.

The fine NiO powder is then mixed with the coarse, porous and hard YSZ granules in the processing of the ceramic slip. In this connection it has surprisingly been found that the very fine fraction of the NiO powder penetrates into the pore spaces of the hard YSZ granular grain material and becomes anchored there. To this end attention is advantageously paid to the order of the addition of the individual components in the production of the slip. The following order has proved to be particularly favourable: first dispersion of metal oxide, then addition and dispersion of the coarse, porous and hard granules of the solid electrolyte, followed by addition and dispersion of the fine fraction of the solid electrolyte. The order: porous, hard granules, nickel oxide, fine granular material is also possible. In this way the metal oxide and not the solid electrolyte powder preferentially penetrates into the pores of the hard granular material. FIG. 3 shows an example of a broad grain size distribution of an NiO powder with a very fine fraction (hatched area). This very fine grain fraction of the NiO of <1 μm is incorporated in the calcined, porous YSZ coarse grain. In FIG. 4 the finely divided nickel (white) in the reduced state can easily be recognised in a hard YSZ granular grain material (grey).

The ceramic NiO—YSZ slip is prepared in ball mills, attrition mills or other preparation equipment commonly used in ceramics. Grinding elements of various sizes (diameter 1 mm up to diameter 20 mm or even larger) are used. In addition, after completion of the mixing of the inorganic powder fractions it is expedient to add combustible space holders such as carbon or carbon fibres in order to maintain the overall porous structure of the anode substrate. This has the special advantage in this case that the carbon activity in metallic melts (such as Ni) governs the reduction of the oxides directly at the interface. This leads to a better wetting of the YSZ by the Ni. The aforedescribed slips can now be processed by the film casting process or screen-printing into anodes. However, compositions such as spray-drying slips for dry pressing or slip casting, plastics compositions for extrusion, calendering or injection moulding, as well as compositions for any other suitable forming and shaping methods may be produced in the manner according to the invention. The fabricated articles are then dried and sintered. For the case described above, sintering was carried out in the temperature range 1400°–1450° C.

The result is an anode cermet having a finely divided microstructure of an Ni phase, a YSZ phase and a continuous pore structure, as is desirable for applications in high temperature fuel cells. The aforedescribed structure improves the ageing stability as regards the electrical conductivity. These hard granular grains of YSZ filled with nickel and homogeneously distributed in the anode form an extremely ageing-stable component in the Ni/YSZ cermet skeleton. The reason for this is that the nickel phase is continuous but is held firmly in the channels, and accordingly due to capillary forces the agglomeration process involved in the ageing of the Ni phase (tendency to minimise the surface energy) is prevented. Very fine outwardly extending ramifications of the Ni phase ensure a good contact starting from the granular grain material and extending to the whole cermet, with the result that a good conductivity (<3000 S·cm at room temperature) was found in these samples. In addition the wetting behaviour of Ni on the YSZ surface is improved by the direct presence of elementary carbon. This leads, in combination with the strong crosslinking of the YSZ and Ni phases within the coarse grains, to an improved ageing stability, which is manifested in a very small drop in the conductivity after 2000 hours of only 13% of the initial conductivity values at room temperature. With other anode materials that have been produced according to the present state of the art, a drop in conductivity of 19% or more was found after 2000 hours.

The particular concept on which the invention is based accordingly consists in the additional introduction of coarse, spongy YSZ particles with an intrinsic porosity, whose mean grain size is preferably at least 10 times greater than that of the very fine fraction of the NiO powder. The particular concept on which the invention is based consists furthermore in the introduction, for example by mixing in, of fine NiO powder into the pore structure of the YSZ granules. It is a feature of the anodes produced from such mixtures that the aforementioned NiO-filled YSZ granules are finely divided in the anode, and also that, after the reduction of the NiO to the electrically conducting Ni phase, a continuous Ni structure is present. Due to these Ni-filled YSZ partial regions in the cermet and appropriate measures taken in the preparation of the ceramic compositions with the object of maintaining a finely divided microstructure, a very ageing-stable structure as regards the electrical conductivity is achieved.

EXAMPLE

The method is illustrated in more detail hereinafter with the aid of an example. The starting materials are 336 g of nickel (II) oxide powder and 264 g of YSZ powder. Of the latter, 80 g consists of coarse grain YSZ powder and 184 g consists of a fine grain YSZ powder. The coarse YSZ powder was obtained from a "TZ-8Y" powder (Tosoh, Japan) by pre-calcining at temperatures above 700° C. this powder already spray-granulated by the manufacturer. The coarse YSZ has a mean grain size of >10 μm. The fine YSZ has a mean grain size of ca. 0.5 μm.

These powders are added to a solvent or solvent mixture (water, ethanol, MEK, toluene, etc.) containing a dispersant, or are stabilised in the solvent or solvent mixture by adjusting the pH value. The order of addition is as follows for the example ethanol/toluene/solvent mixture: first, addition of the solvent mixture, followed by the dispersant, and then the NiO powder. After mixing for 5 minutes (e.g. tumble mixer or ball mill) coarse hard YSZ is added (pre-dried) and mixing is renewed before the fine YSZ is added. The order may also be coarse YSZ, NiO, fine YSZ. Of course, the mixing duration is then determined by the second powder addition step (5 minutes to several hours).

With this mixing procedure the very fine fraction of the NiO powder penetrates the continuous pore channels of the coarse YSZ granules. The procedure is then continued as in the conventional slip production. Binders, plasticisers, optionally thermal compression binders, defoaming agents and surfactants are added at various intervals. In addition graphite is added to the mixture in order to adjust the porosity. The ceramic composition thereby obtained is matched to the viscosity necessary for further processing (film casting: 1000–100,000 mPa·s), if necessary by evaporating the solvents in for example a rotary evaporator. The composition may be processed further by film casting, calendering or other thin-layer or thick-layer techniques. The green substrates obtained in this way and/or green anode function layers are, after they have completely dried, sintered at temperatures up to 1500° C. and then reduced in an $Ar-H_2$ mixture to the desired cermets or cermet layers.

The principle of the production and stabilisation of a metallic phase in or on a foreign component, such as for example oxide powder particles (oxide powder matrix)—in this particular case solid electrolyte material—can be applied in general to composite materials and cermets. The method may thus be employed universally if one phase is to be incorporated into the pores of another phase with the object of stabilising the first phase in the second phase. The advantageous modifications relating to the production of the electrode also apply to the general case.

The invention claimed is:

1. A method of producing an electrode for use at high temperatures comprising the steps of:
   a) forming a slip consisting of at least one solid electrolyte material as well as a metal oxide powder wherein the solid electrolyte material is in the form of porous granules and the mean diameter of the metal oxide powder grains does not substantially exceed the mean diameter of the pores in the granules of solid electrolyte material;
   b) forming a green compact from the slip;
   c) drying the green compact; and
   d) sintering the dried green compact to form an electrode.

2. The method according to claim 1, in which the metal oxide powder fraction in the slip is at least 20 vol. %.

3. The method according to claim 2, in which the porous granules of electrolyte material fraction in the slip is at least 5 to 40 volume percent.

4. The method according to claim 3, in which the metal oxide powder is nickel oxide powder.

5. The method according to claim 4, in which the solid electrolyte material is yttrium-stabilised zirconium dioxide.

6. The method according to claim 3, in which the slip further comprises a powder of solid electrolyte material in addition to the porous granules of electrolyte material.

7. The method according to claim 3, in which the mean diameters of the powder grains of electrolyte material are up to 1 μm in mean diameter.

8. The method according to claim 6, in which the slip is formed by the following steps: dispersing of the metal oxide powder, followed by addition and dispersing of the granules of the porous granules of solid electrolyte, and then addition and dispersing of the powder of the solid electrolyte material.

9. The method according to claim 6, in which the slip is formed by the following steps: dispersing of the porous granules of the solid electrolyte, followed by addition and dispersing of the metal oxide powder, and then addition and dispersing of the powder of the solid electrolyte material.

10. The method according to claim 1 or 3, in which dispersants are added to the slip.

11. The method according to claim 1 or 3, in which a binder or binder system is added to the slip.

12. The method according to claim 1 or 3, in which the mean diameter of the granular grains of electrolyte material is at least 10 μm.

13. The method according to claim 1 or 3, in which the mean diameter of the pores of the porous granules of electrolyte material is at least five times and the mean diameter of the metal oxide powder grains.

14. The method according to claim 1 or 3, in which the mean diameter of the porous granules of electrolyte material is at most 100 times the mean diameter of the metal oxide powder grains.

15. The method according to claim 1 or 3, in which the porous granules of electrolyte material are calcined before being added to the slip.

16. The method according to claim 1 or 3, in which the porous granules of electrolyte material have pores of mean size from 0.1 to 2.0 μm.

17. The method according to claim 1 or 3, in which the porous granules of electrolyte material is an open-pore material.

18. The method according to claims 1 or 3, in which the porous granules of electrolyte material have such a strength as to withstand the method of producing an electrode.

19. The method according to claim 1 or 3, in which the dried green compact is sintered at temperatures above 1300° C.

20. A method of producing a composite body comprising the steps of:
   a) forming a slip consisting of at least one solid electrolyte material as well as a powder wherein the solid electrolyte material is in the form of porous granules and the mean diameter of the powder grains does not substantially exceed the mean diameter of the pores in the granules of solid electrolyte material;
   b) forming a green compact from the slip;
   c) drying the green compact; and
   d) sintering the dried green compact to form an electrode.

* * * * *